(12) United States Patent
Goto et al.

(10) Patent No.: US 12,128,680 B2
(45) Date of Patent: Oct. 29, 2024

(54) RECORDING APPARATUS, RECORDING AND READING SYSTEM, AND RECORDING METHOD

(71) Applicant: SEIKO EPSON CORPORATION, Tokyo (JP)

(72) Inventors: Atsushi Goto, Nagano (JP); Eiichi Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 17/936,396

(22) Filed: Sep. 29, 2022

(65) Prior Publication Data
US 2023/0105968 A1    Apr. 6, 2023

(30) Foreign Application Priority Data
Oct. 1, 2021    (JP) .................................. 2021-162854

(51) Int. Cl.
*B41J 29/393*    (2006.01)
*B41J 2/045*    (2006.01)

(52) U.S. Cl.
CPC ......... *B41J 2/04505* (2013.01); *B41J 29/393* (2013.01); *B41J 2029/3935* (2013.01)

(58) Field of Classification Search
CPC ..................................................... B41J 29/393
See application file for complete search history.

(56) References Cited

U.S. PATENT DOCUMENTS

| | | |
|---|---|---|
| 2004/0189729 A1 | 9/2004 | Nakahanada et al. |
| 2005/0099446 A1 | 5/2005 | Mizes et al. |
| 2006/0209101 A1 | 9/2006 | Mizes |
| 2007/0030300 A1 | 2/2007 | Jeong |
| 2008/0137143 A1 | 6/2008 | Mizes |
| 2009/0003729 A1 | 1/2009 | Metcalfe et al. |
| 2011/0116123 A1 | 5/2011 | Mizes et al. |
| 2013/0278670 A1 | 10/2013 | Tanase et al. |

FOREIGN PATENT DOCUMENTS

| | | |
|---|---|---|
| JP | 2004-299109 A | 10/2004 |
| JP | 2004-299112 A | 10/2004 |
| JP | 2004-304327 A | 10/2004 |
| JP | 2013-223988 A | 10/2013 |

*Primary Examiner* — Julian D Huffman
(74) *Attorney, Agent, or Firm* — Global IP Counselors, LLP

(57) ABSTRACT

A recording apparatus includes a recording head that has a plurality of nozzles that eject liquid onto a medium and a control section that controls an ejection of liquid by the recording head, wherein the control section controls the recording head to record a plurality of first patterns having mutually different densities on the medium in a intersecting direction that intersects a nozzle alignment direction in which the nozzles are arranged, and to record a plurality of second patterns for identifying positions of the nozzles in the nozzle alignment direction on the medium in the intersecting direction such that each of the plurality of first patterns is adjacent to the second patterns on at least one of one end side and the other end side in the intersecting direction.

6 Claims, 7 Drawing Sheets

RECORDING APPARATUS, RECORDING AND READING SYSTEM, AND RECORDING METHOD

The present application is based on, and claims priority from JP Application Serial Number 2021-162854, filed Oct. 1, 2021, the disclosure of which is hereby incorporated by reference herein in its entirety.

BACKGROUND

1. Technical Field

The present disclosure relates to a recording apparatus, a recording and reading system, and a recording method.

2. Related Art

A recording apparatus is known that performs recording by ejecting liquid from a nozzle so that dots land on a medium. In the recording result by such a recording apparatus, density unevenness, such as white streaks or black streaks, may occur due to variations in ejection characteristics of each nozzle. A method of eliminating density unevenness when density unevenness occurs is known in which a test pattern is recorded on a medium, a density correction value for each raster line corresponding to each nozzle position is acquired from image data of the test pattern read by a scanner, and the density of each raster line is corrected based on the density correction value.

As related art, in JP-A-2013-223988 a configuration of a printer having a first nozzle array and a second nozzle array is known, that prints a test pattern in which a plurality of dot rows, which are formed along an intersecting direction intersecting a predetermined direction in which nozzles are arranged, are arranged in a predetermined direction, that prints a plurality of ruled lines arranged in a predetermined direction so as to be adjacent to the test pattern, that calculates a density correction value for each raster line according to the density of each raster line, which are arranged in a predetermined direction, detected from the image data obtained by reading the test pattern, and that associates a position for each nozzle included in the nozzle array identified by the position of the ruled lines, with the position of each raster line for which the density correction values is calculated.

When scanning the medium on which the ruled lines and the test pattern are recorded as described above using a sheet-feed type scanner, if the medium being transported is tilted, that is, if skew occurs, it may be difficult to accurately obtain the reading value, the density correction value, and the like in the test pattern corresponding to the nozzle position based on the position of the ruled lines. Therefore, there is a demand for a technique useful for accurately acquiring information corresponding to the nozzle position from the reading result, even if skew occurs during reading.

SUMMARY

A recording apparatus including a recording head having nozzles that eject liquid onto a medium and a control section that controls ejection of the liquid from the recording head, wherein the control section, by controlling the recording head, records a plurality of first patterns having mutually different densities, on the medium in an intersecting direction intersecting a nozzle alignment direction in which the nozzles are arranged and records a plurality of second patterns for identifying positions of the nozzles in the nozzle alignment direction, on the medium in the intersecting direction, so that each of the plurality of first patterns is adjacent to a second pattern on at least one of one end side or the other end side in the intersecting direction.

A recording and reading system, including the recording apparatus, a reading section that reads the pattern recorded on the medium by the recording apparatus, and an identifying section that, based on a read result by the reading section of the first patterns and the second patterns that are adjacent to each other, identifies read values in the first patterns corresponding to positions of the nozzles in the nozzle alignment direction.

A recording method for performing recording by controlling a recording head having a plurality of nozzles for ejecting liquid onto a medium, comprising a pattern recording step of recording a pattern on the medium by controlling ejection of liquid from the recording head, wherein the pattern recording step records a plurality of first patterns having mutually different densities, on the medium in an intersecting direction intersecting a nozzle alignment direction in which the nozzles are arranged and records a plurality of second patterns for identifying positions of the nozzles in the nozzle alignment direction, on the medium in the intersecting direction, so that each of the plurality of first patterns is adjacent to a second pattern on at least one of one end side or the other end side in the intersecting direction.

DESCRIPTION OF EMBODIMENTS

Hereinafter, embodiments of the present disclosure will be described with reference to the drawings. Note that the drawings are merely examples for describing the present embodiment. Since each drawing is an example, ratios or shapes may not be accurate, may not match each other, or may be partially omitted.

1. General Description of System

Figure 1:
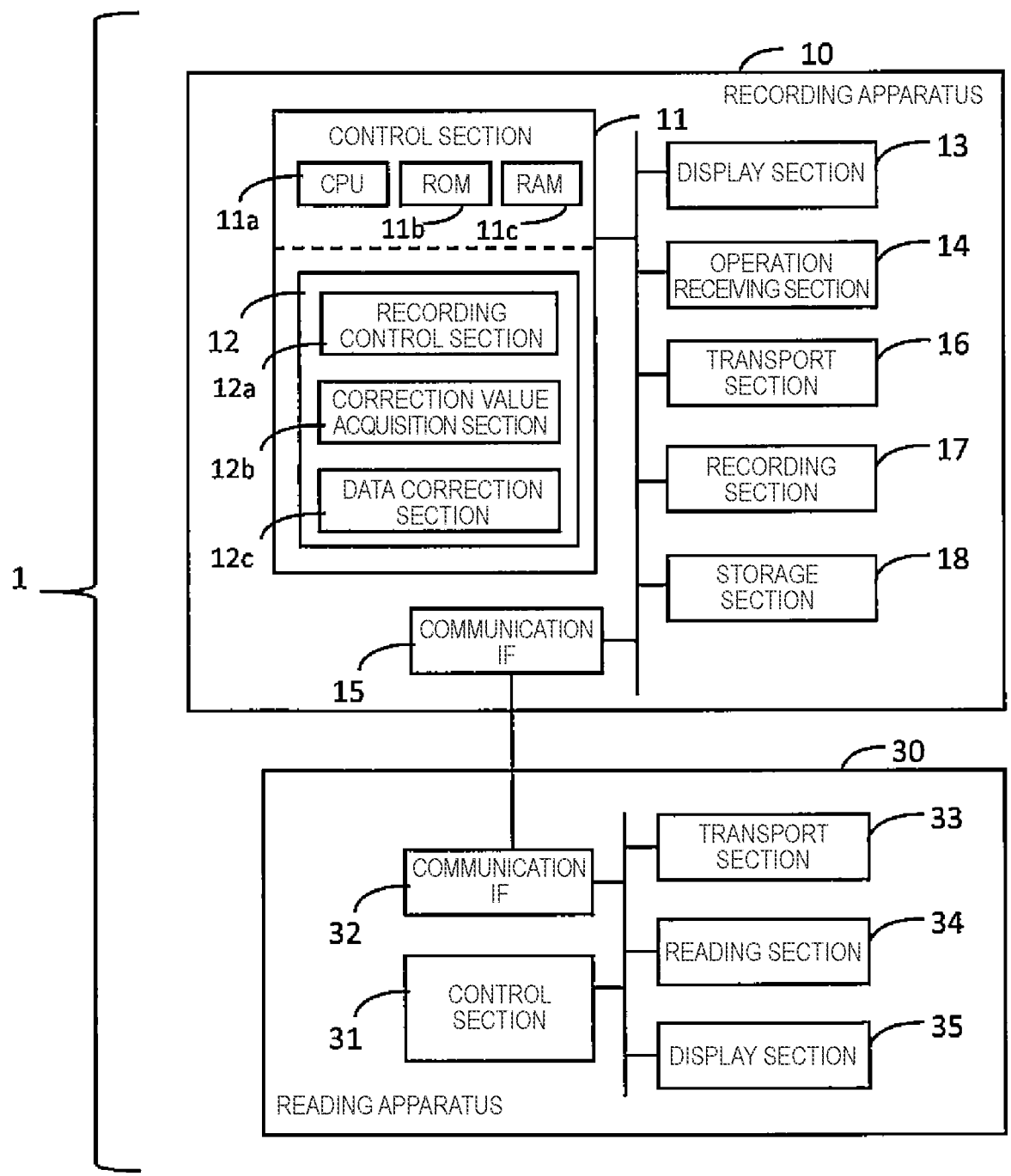
FIG. 1 is a block diagram schematically showing a system configuration of the present embodiment.

FIG. 1 schematically shows the configuration of a recording and reading system 1 according to the present embodiment. The recording and reading system 1 may be referred to as a pattern recording system 1, a data correction system 1, or the like. The recording and reading system 1 includes a recording apparatus 10 and a reading apparatus 30. A recording method of the present embodiment is executed by the recording apparatus 10.

The recording apparatus 10 includes a control section 11, a display section 13, an operation receiving section 14, a communication IF 15, a transport section 16, a recording section 17, and a storage section 18. IF is an abbreviation for interface. The control section 11 is configured to include one or a plurality of ICs having a CPU 11a as a processor, a ROM 11b, a RAM 11c, and the like, and other nonvolatile memory, and the like. In the control section 11, a processor, that is, the CPU 11a executes arithmetic processing according to a program 12 stored in the ROM 11b, another memory, or the like, using the RAM 11c or the like as a work area.

The control section 11 performs a plurality of functions, such as that of a recording control section 12a, a correction value acquisition section 12b, and a data correction section 12c, in accordance with the program 12. These functions are merely a portion of the functions performed by the program 12 in the control section 11. The processor is not limited to a single CPU, and may be configured to perform processing by a plurality of CPUs or a hardware circuit such as an ASIC, or may be configured to perform processing in cooperation with a CPU and a hardware circuit.

The display section 13 is a means for displaying visual information, and is configured by, for example, a liquid crystal display, an organic EL display, or the like. The display section 13 may have a configuration including a display and a drive circuit for driving the display. The operation receiving section 14 is a means for receiving an operation by a user, and is realized by, for example, a physical button, a touch panel, a mouse, a keyboard, or the like. Needless to say, the touch panel may be realized as one function of the display section 13. The display section 13 and the operation receiving section 14 may be collectively referred to as an operation panel of the recording apparatus 10. The display section 13 and the operation receiving section 14 may be a portion of the configuration of the recording apparatus 10, or may be peripheral devices externally attached to the recording apparatus 10.

The communication IF 15 is a general term for one or a plurality of IFs for the recording apparatus 10 to perform communication with another apparatus by wire or wirelessly in accordance with a predetermined communication protocol including a known communication standard. In the example of FIG. 1, the recording apparatus 10 is connected to the reading apparatus 30 via the communication IF 15. The recording apparatus 10 can communicate with various external devices not shown in FIG. 1 via the communication IF 15, and not just with the reading apparatus 30.

The transport section 16 is a means for transporting a recording medium along a predetermined transport direction under the control of the control section 11, and includes, for example, a roller (not shown) that rotates to transport the medium, a motor (not shown) for driving the roller, and the like. The medium is typically paper, but may be a medium made of a material other than paper as long as the medium that can be recorded on using liquid.

The recording section 17 is a mechanism that performs recording on the medium by ejecting liquid, such as ink, by an inkjet method. The recording section 17 has a recording head 20 (to be described later). The recording head 20 includes a plurality of nozzles 21 for ejecting liquid, and under the control of the control section 11 ejects liquid from each nozzle 21 to the medium 40 transported by the transport section 16. The droplets ejected from the nozzles 21 are also referred to as dots. The recording head 20 may be referred to as a liquid ejection head, an imaging head, a print head, an inkjet head, or the like.

The storage section 18 is, for example, a hard disk drive, a solid state drive, or other memory storage means. A portion of the memory included in the control section 11 may be regarded as the storage section 18. The storage section 18 may be regarded as a portion of the control section 11.

The reading apparatus 30 includes a control section 31, a communication IF 32, a transport section 33, a reading section 34, a display section 35, and the like. Similarly to the control section 11, the control section 31 includes a processor, a memory, a program, and the like, and these control the reading apparatus 30 in cooperation with each other. The communication IF 32 is a general term for one or a plurality of IFs for the reading apparatus 30 to perform communication with another apparatus by wire or wirelessly in accordance with a predetermined communication protocol including a known communication standard, and is connected to the communication IF 15 of the recording apparatus 10 in the example of FIG. 1.

Similar to the display section 13, the display section 35 is a means for displaying visual information. Of course, the reading apparatus 30 may also include an operation receiving section. The transport section 33 is a means for transporting an original document to be read along a predetermined transport direction under the control of the control section 31, and includes, for example, a roller (not shown) that rotates to transport the original document, a motor (not shown) for driving the roller, and the like. The medium 40 after recording by the recording apparatus 10 becomes one kind of original document for the reading apparatus 30. Hereinafter, the original document read by the reading apparatus 30 may be referred to as a medium 40.

The reading section 34 is a mechanism for optically reading an original document transported by the transport section 33. Although details are omitted, the reading section 34 includes a light source for illuminating the original document, an image sensor for receiving reflected light or transmitted light from the original document through a predetermined reading surface and generating an electric signal by photoelectric conversion, and an image processing circuit for generating read image data as a result of reading the original document by performing predetermined conversion or correction on the electric signal output from the image sensor. The image processing circuit may be a portion of the control section 31. The image sensor is a line sensor that is elongated in the width direction of the original document and intersects with the transport direction of the original document by the transport section 33. The line sensor is configured by arranging a plurality of photoelectric conversion elements along the width direction of the original document. Such a reading apparatus 30 is a sheet feed type scanner.

The control section 11, the display section 13, the communication IF 15, and the transport section 16 of the recording apparatus 10 and the control section 31, the display section 35, the communication IF 32, and the transport section 33 of the reading apparatus 30 may be referred to as a first control section 11, a first display section 13, a first communication IF 15, a first transport section 16, a second control section 31, a second display section 35, a second communication IF 32, and a second transport section 33, respectively, for convenience of distinguishing them.

The recording apparatus 10 and the reading apparatus 30 may be regarded as independent apparatuses. In this case, the medium 40 after being recorded on by the recording apparatus 10 is set in the transport section 33 of the reading apparatus 30 by the user, and the medium 40 that was recording on is read by the reading section 34.

Alternatively, the recording apparatus 10 and the reading apparatus 30 may be integrally configured. That is, the recording and reading system 1 may be a single apparatus including the recording apparatus 10 and the reading apparatus 30. In this case, the medium 40 after being recorded on by the recording section 17 is consecutively transported to the reading section 34 and read by the reading section 34. In other words, the reading section 34 may be disposed in-line downstream of the recording section 17 in the transport direction.

In the case where the recording apparatus 10 and the reading apparatus 30 are integrally configured, the transport section 16 and the transport section 33 are a substantially integrated transport means, and it is not necessary to distinguish them for understanding the present embodiment. Similarly, the control section 31 may be regarded as a portion of the control section 11, or the display section 13 and the display section 35 may be regarded as the same object.

Hereinafter, the description will be continued without particularly distinguishing whether the recording apparatus 10 and the reading apparatus 30 are independent apparatuses or an integrated apparatus.

Figure 2:
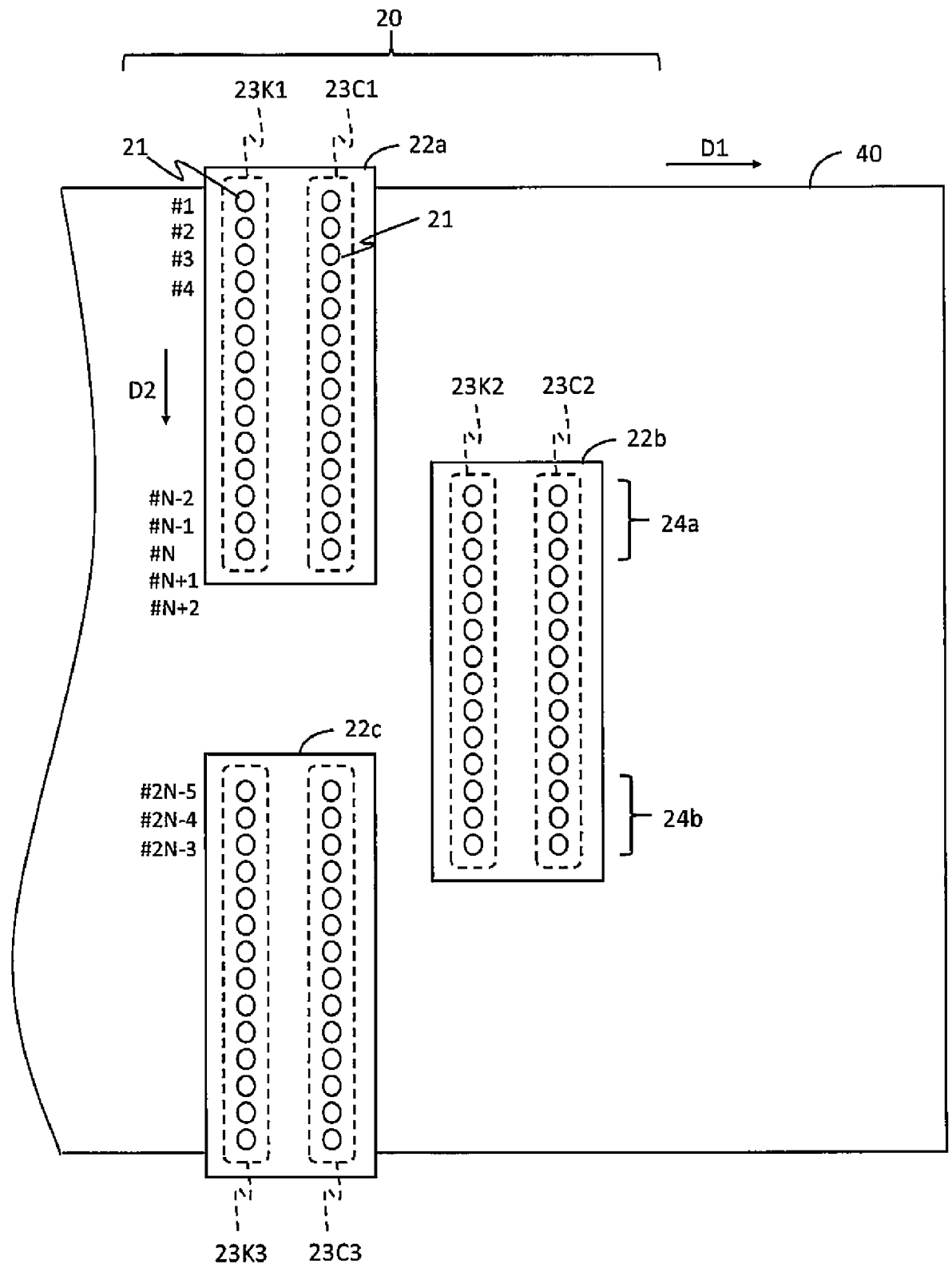
FIG. 2 is a diagram schematically showing a relationship between a recording head and a medium from a viewpoint from above.

FIG. 2 shows the relationship between the recording head 20 and the medium 40 in a simplified manner as viewed from above. In FIG. 2, the transport direction of the medium 40 by the transport section 16 is indicated by a reference sign D1. The recording head 20 is fixed at a predetermined position of the transport path by the transport section 16, in a state in which a plurality of head chips 22a, 22b, 22c are connected to each other in a nozzle alignment direction D2, which intersects the transport direction D1. That is, the recording head 20 is configured such that the length of the recording head 20 in the nozzle alignment direction D2 can cover the width of the medium 40 in the nozzle alignment direction D2. The plurality of head chips 22a, 22b, 22c may have the same configuration. Of course, the number of head chips constituting the recording head 20 is not limited to three as shown in FIG. 2.

FIG. 2 shows an arrangement of the nozzles 21 on a surface of the recording head 20 facing the medium 40. In FIG. 2, circles represent individual nozzles 21. In a configuration in which ink of each color is supplied from a liquid holding section (not shown) called an ink cartridge, an ink tank, or the like and is ejected from the nozzles 21, the recording head 20 has nozzle arrays for each ink color. In FIG. 2, the head chips 22a, 22b, 22c respectively have K-ink nozzle arrays 23K1, 23K2, 23K3 comprised of a plurality of nozzles 21 for ejecting black (K) ink, and have C-ink nozzle arrays 23C1, 23C2, 23C3 composed of a plurality of nozzles 21 for ejecting cyan (C) ink. The nozzle arrays 23K1, 23K2, 23K3 included in the head chips 22a, 22b, 22c may be collectively regarded as a nozzle array for ejecting the K ink of the recording head 20. Similarly, the nozzle arrays 23C1, 23C2, 23C3 included in the head chips 22a, 22b, 22c may be collectively regarded as a nozzle array for ejecting the C ink of the recording head 20.

The direction in which the plurality of nozzles 21 constituting the nozzle arrays are arranged at a fixed or substantially fixed interval (nozzle pitch) is the nozzle alignment direction D2. As a configuration of the recording head 20, an example in which the nozzle alignment direction D2 obliquely intersects with the transport direction D1 is known, but FIG. 2 illustrates an example in which the nozzle alignment direction D2 and the transport direction D1 are orthogonal to each other. However, the term "orthogonal" is not limited to strictly orthogonal, and may be an intersection including an error that may occur in a product. In FIG. 2, a plurality of nozzle arrays for each ink color are arranged along the transport direction D1, and are at the same position with respect to the nozzle alignment direction D2. The K ink nozzle arrays of the recording head 20 may be referred to as a "first nozzle array", and the C ink nozzle arrays of the recording head 20 may be referred to as a "second nozzle array".

The head chips constituting the recording head 20 are connected to each other in such a positional relationship in which a portion thereof overlaps with each other in the nozzle alignment direction D2. A nozzle range in which the head chips overlap each other in this manner is referred to as an overlap (OL) portion. FIG. 2 shows an OL portion 24a shared by the head chips 22a and 22b, and an OL portion 24b shared by the head chips 22b and 22c. In the recording head 20, a nozzle range that does not correspond to the OL portion is referred to as a normal portion.

In FIG. 2, for convenience of explanation, a nozzle position number is given to each position (hereinafter referred to as a nozzle position) in the nozzle alignment direction D2 of each nozzle 21 constituting a nozzle array corresponding to one ink color of the recording head 20. Here, it is assumed that a nozzle array corresponding to one ink color in one nozzle chip is constituted by N nozzles 21, and that the overlap portion between nozzle chips corresponds to three nozzles. Therefore, in the example of FIG. 2, nozzle position numbers are given, in the order of #1, #2, #3, . . . , #N−2, #N−1, #N, #N+1, #N+2, . . . , one to each nozzle to one nozzle array spanning the three nozzle chips 22a, 22b, 22c, from one end side toward the other end side in the nozzle alignment direction D2. Since the nozzle arrays for the different ink colors match positions in the nozzle alignment direction D2, the nozzle position number is information common to the nozzle arrays for the different ink colors.

According to FIG. 2, the three consecutive nozzle position numbers #N−2, #N−1 and #N correspond to the OL portion 24a shared by the head chips 22a and 22b. Similarly, the three consecutive nozzle position numbers #2N−5, #2N−4, and #2N−3 correspond to the OL portion 24b shared by the head chips 22b and 22c. Therefore, there are two nozzles 21 for one ink color corresponding to each of the nozzle position numbers #N−2, #N−1, #N, #2N−5, #2N−4, and #2N−3 in the OL portion 24a and 24b. On the other hand, there is one nozzle 21 for one ink color corresponding to each of the nozzle position numbers that do not correspond to the OL portions 24a, 24b.

In the example of FIG. 2, a line recorded on the medium 40 with the transport direction D1 as the longitudinal direction is called a "raster line". A raster line is a pixel array in which a plurality of pixels in the image data state are arranged in the transport direction D1. A raster line is an array of dots oriented in the transport direction D1 on the medium 40. However, the length of a raster line is not limited. When paying attention to on recording with one color of ink, each raster line recorded by the nozzles 21 in normal portions is recorded by ink ejection from one nozzle 21. On the other hand, for each raster line recorded by the nozzles 21 of the OL portion, one raster line is recorded by ink ejected from two nozzles 21.

In this manner, a method of recording raster lines with a plurality of nozzles 21 for one color of ink is called OL recording. For example, when paying attention to recording with K ink, a common raster line is OL recorded by being shared by two nozzles 21 that correspond to the nozzle position number #N and that belong to the nozzle arrays 23K1, 23K2. Therefore, the nozzle position and the nozzle position number explained in the present embodiment are also the position of each raster line in the nozzle alignment direction D2. The control section 11 simultaneously performs transport of the medium 40 at a predetermined speed from the upstream side to the downstream side in the transport direction D1 using the transport section 16 and ink ejection from the recording head 20, in order to perform two-dimensional printing on the medium 40 of an image, based on image data representing the image.

Although omitted due to space limitations in the drawings, naturally the recording head 20 may have a nozzle array other than the nozzle array for K ink (nozzle arrays 23K1, 23K2, 23K3) and for C ink (nozzle arrays 23C1, 23C2, and 23C3). For example, the recording head 20 may have a nozzle array for ejecting magenta (M) ink, a nozzle array for ejecting yellow (Y) ink, a nozzle array for ejecting other inks or for liquids other than ink, and the like.

2. Recording and Reading Patterns

Figure 3:
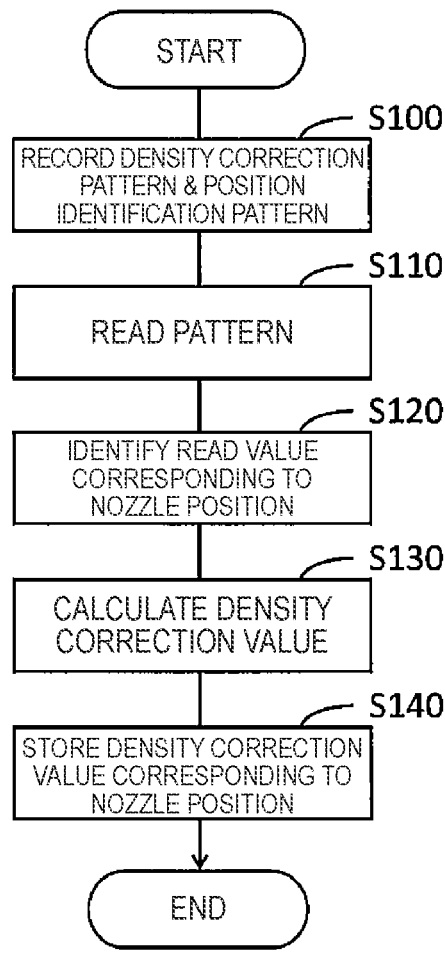
FIG. 3 is a flowchart showing a flow from recording of a pattern to storing of a density correction value.

FIG. 3 is a flowchart showing a flow from recording of a pattern to storage of a density correction value that is executed by the recording and reading system 1. Even in a case where the recording apparatus 10 and the reading apparatus 30 constituting the recording and reading system 1 are separate apparatuses, in FIG. 3, the processes executed by the apparatuses 10 and 30 are summarized and briefly described in one flowchart.

In step S100, the recording control section 12a of the control section 11 controls the recording section 17 and the transport section 16 to, based on the image data for pattern recording stored in advance in the storage section 18 or the like, record the "density correction pattern" and the "position identification pattern" on the medium 40. The image data for pattern recording is image data representing the density correction pattern and the position identification pattern. The density correction pattern corresponds to a "first pattern", and the position identification pattern corresponds to a "second pattern" for identifying the position of the nozzles 21 in the nozzle alignment direction D2. Step S100 is a "pattern recording step" of recording a pattern on the medium 40.

In step S100, by controlling the recording head 20, the recording control section 12a records a plurality of density correction patterns, which have mutually different densities, on the medium 40 in an intersecting direction that intersects the nozzle alignment direction D2, that is, in the transport direction D1, and records a plurality of position identification patterns on the medium 40 in the intersecting direction. At this time, each of the plurality of density correction patterns is recorded so as to be adjacent to the position identification pattern on at least one of one end side and the other end side in the intersecting direction. "Adjacent to" includes both cases where they are adjoining and cases where they are not in contact but are located next to each other.

In step S110, the control section 31 controls the transport section 33 and the reading section 34, and causes the reading section 34 to read the pattern recorded on the medium 40 in step S100. As can be understood from the description of FIG. 2, some of the raster lines constituting the pattern recording result of step S100 are OL recorded by the nozzles 21 corresponding to the OL portion.

Figure 4:
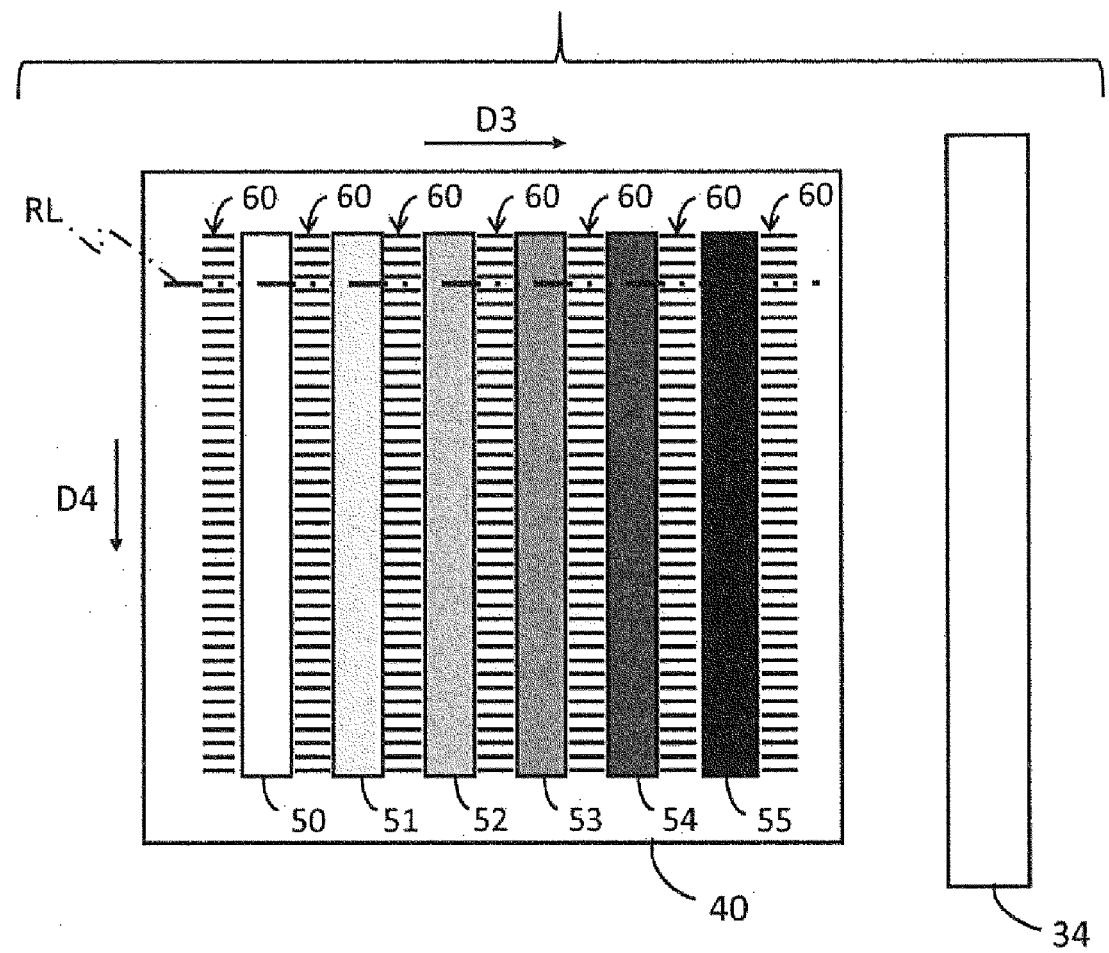
FIG. 4 is a view schematically showing a medium after pattern recording and a reading section from a viewpoint from above.

FIG. 4 is a simplified top view of the medium 40 and the reading section 34 after the pattern recording in step S100.

Figure 5A:
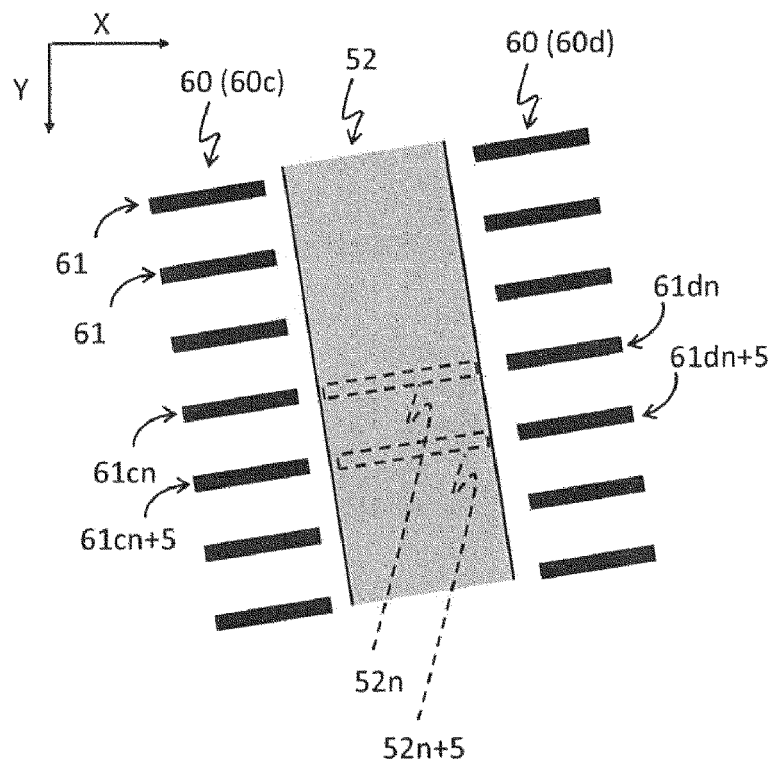
FIG. 5A is a diagram for explaining a specific example of step S120.

Note that the skew of the medium 40 to be described later with reference to FIG. 5A is not represented in FIG. 4. In FIG. 4, a plurality of density correction patterns 50, 51, 52, 53, 54, 55 are recorded on the medium 40 along the direction D3 with spaces in between, and a position identification pattern 60 is recorded at positions sandwiching each of the density correction patterns 50, 51, 52, 53, 54, 55 in the direction D3.

As an example, each pattern 50, 51, 52, 53, 54, 55, 60 is recorded with K ink. However, the position identification pattern 60 may be recorded with ink of a color different from that of the density correction patterns 50, 51, 52, 53, 54, 55. The direction D3 is the longitudinal direction of the raster line, and is also the transport direction for transporting the medium 40 toward the reading section 34 in the view of FIG. 4. In a configuration in which the reading section 34 is assembled downstream of the recording head 20 in the transport direction D1, it can be understood that the transport direction D1=D3.

Each of the density correction patterns 50, 51, 52, 53, 54, 55 are recorded with different densities of K. The density may be understood as a dot generation rate per unit area, a coverage rate by dots, or the like. Further, each of the density correction patterns 50, 51, 52, 53, 54, 55 is a band-shaped pattern having a longitudinal direction in a direction D4 that intersects the direction D3, and each pattern 50, 51, 52, 53, 54, 55 has a constant density. Here, "constant density" means that the density represented by the image data for pattern recording is a constant value for each pattern 50, 51, 52, 53, 54, 55, and within each pattern 50, 51, 52, 53, 54, 55 actually recorded on the medium 40, shading, that is, density unevenness occurs according to variations or the like in the ejection characteristics of each nozzle 21.

The direction D4 for the medium 40 corresponds to the nozzle alignment direction D2 when the recording head 20 performs recording on the medium 40. In FIG. 4, the density correction patterns 50, 51, 52, 53, 54, 55 are denser in this order. For example, the density correction pattern 50, the density correction pattern 51, the density correction pattern 52, the density correction pattern 53, the density correction pattern 54, and the density correction pattern 55 are recorded at densities (constant values) determined in the image data, such as 5%, 20%, 40%, 60%, 80%, and 100%, respectively. With respect to the medium 40 after such a pattern recording, assuming that, as shown by a two dot chain line in FIG. 4, one raster line RL has the maximum length in the direction D3, then this raster line RL will include a portion of each density correction pattern 50, 51, 52, 53, 54, 55.

Each of the plurality of position identification patterns 60 may be regarded as the same image. Each of the plurality of position identification patterns 60 is composed of a plurality of pattern elements formed at intervals in the nozzle alignment direction D2. The pattern elements are ruled lines having a length component in the longitudinal direction of the raster line. As a result, as shown in FIG. 4, a plurality of position identification patterns 60, in which ruled lines extending in the direction D3 are arranged at intervals in the direction D4, are recorded on the medium 40 so as to be positioned on both sides of each of the density correction patterns 50, 51, 52, 53, 54, 55. In this manner, each ruled line constituting the position identification pattern 60 is recorded by the nozzles 21 at each nozzle position for every fixed number of nozzle positions, for example, one for every five nozzle positions or one for every ten nozzle positions.

As shown in FIG. 4, the reading section 34 has the direction D4 as the longitudinal direction. That is, the line sensors included in the reading section 34 are arranged with the direction D4 as a longitudinal direction. Therefore, the medium 40 after pattern recording is transported in the direction D3, and the reading section 34 reads the medium 40, so that each density of the density correction patterns 50, 51, 52, 53, 54, 55 is obtained for each raster line position, that is, for each nozzle position. The read image data generated by the reading section 34 as the read result of the medium 40 includes, for example, brightness or the like for each pixel, but a value (read value) of the read image data may also be referred to as "density" herein. The density correction patterns 50, 51, 52, 53, 54, 55 are patterns for calculating "density correction values" for correcting variations in density for each nozzle position. The calculation of the density correction value will be described later.

The control section 31 transfers the read image data of the medium 40 to the control section 11.

3. Calculation of Density Correction Value

In step S120, the correction value acquisition section 12b of the control section 11 analyzes the read image data of the medium 40 and, based on the read results of adjacent density correction patterns and the position identification patterns, identifies each read value in the density correction pattern corresponding to each nozzle position. The correction value acquisition section 12b, which executes step S120, corresponds to an "identifying section".

FIG. 5A is a diagram for explaining a specific example of step S120, and shows a portion of the read image data in an enlarged manner. FIG. 5A shows, in the read image data, a portion of the density correction pattern 52 and a portion of the position identification patterns 60c and 60d, which are the position identification patterns 60 on either side of the density correction pattern 52. In the read image data, the position of each pixel is defined in a two dimensional coordinate system with an X axis and a Y axis orthogonal to each other.

When correspondence FIG. 5A and FIG. 4 is considered, the X-axis direction corresponds to the direction D3 and the Y-axis direction corresponds to the direction D4. However, when the medium 40 after pattern recording is transported toward the reading section 34 by the transport section 16 or the transport section 33, if a skew occurs in the medium 40, then in the obtained read image data, the density correction pattern 52 and the position identification patterns 60c and 60d are drawn in a state of being inclined with respect to the X-axis and the Y-axis as illustrated in FIG. 5A. That is, in the read image data, it is ideal that the respective ruled lines constituting the position identification patterns 60c, 60d are parallel to the X axis, but if there is a skew in the medium 40 at the time of reading, they will not be parallel.

As described above, each ruled line 61 constituting the position identification patterns 60 is recorded by the nozzles 21 at each nozzle position for every fixed number of nozzle positions. Therefore, when focusing on one position identification pattern 60, the correction value acquisition section 12b can grasp which number of ruled line 61 in the Y axis direction is recorded by the nozzle 21 at which nozzle position. Here, in FIG. 5A, one ruled line 61cn belonging to the position identification pattern 60c is a ruled line recorded by the nozzle 21 having the nozzle position number #n. One ruled line 61dn belonging to the position identification pattern 60d is also a ruled line recorded by the nozzle 21 having the nozzle position number #n. Similarly, the ruled line 61cn+5, which is next to the ruled line 61cn belonging to the position identification pattern 60c, is a ruled line recorded by the nozzle 21 having the nozzle position number #n+5, and the ruled line 61dn+5, which is next to the ruled line 61dn belonging to the position identification pattern 60d, is a ruled line recorded by the nozzle 21 having the nozzle position number #n+5.

Therefore, from among the densities in the density correction pattern 52 in the read image data, the correction value acquisition section 12b identifies the density of a pixel region 52n, which is located on a straight line connecting the ruled line 61cn and the ruled line 61dn, as a read value corresponding to the nozzle position number #n. Similarly, among the densities in the density correction pattern 52 in the read image data, the correction value acquisition section 12b identifies the density of a pixel region 52n+5, which is located on a straight line connecting the ruled line 61cn+5 and the ruled line 61dn+5, as a read value corresponding to the nozzle position number #n+5.

As can be understood from the above description, nozzle positions also exist between the ruled lines 61 constituting the position identification pattern 60. In the example of FIG. 5A, as can be understood from the relationship between "n" and "n+5", a case is assumed that there are four nozzle positions at equal intervals between the ruled line 61 and the ruled line 61 constituting one position identification pattern 60. Therefore, the correction value acquisition section 12b identifies densities corresponding to each of the nozzle position numbers #n+1, #n+2, #n+3, and #n+4 between the pixel region 52n and the pixel region 52n+5 in the density correction pattern 52, by an interpolation calculation based on the positional relationship in the Y-axis direction between the ruled line 61cn and the ruled line 61cn+5 and the positional relationship between the ruled line 61dn and the ruled line 61dn+5.

As described above, the correction value acquisition section 12b uses the position of each ruled line 61 in the position identification pattern 60c and in the position identification pattern 60d, which are adjacent to the density correction pattern 52, and, as a result, can identify the density corresponding to each of all the nozzle positions as read values in the density correction pattern 52. Of course, for each of the other density correction patterns 50, 51, 53, 54, 55 as well, the correction value acquisition section 12b identifies the density for each nozzle position by using the positions of the ruled lines 61 of the adjacent position identification patterns 60 in the same manner as described above with respect to the density correction pattern 52.

Figure 5B:
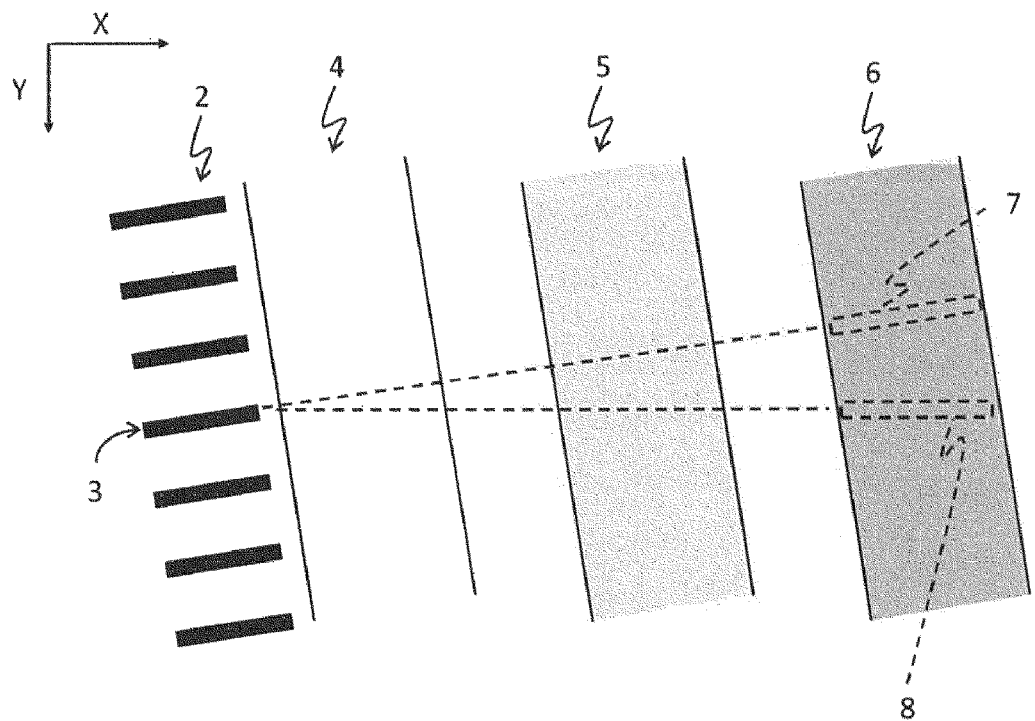
FIG. 5B is a diagram for explaining a problem in the prior art

FIG. 5B is a view for explaining a related art example, and shows a portion of read image data as a read result of a medium after pattern recording in an enlarged form. FIG. 5B is viewed in the same manner as FIG. 5A. Also in FIG. 5B, similarly to FIG. 5A, it is assumed that the medium is skewed at the time of reading by the reading section 34. FIG. 5B shows, in the read image data, a portion of density correction patterns 4, 5, and 6, and a portion of a position identification pattern 2, which is adjacent to the density correction pattern 4. The density correction patterns 4, 5, and 6 may be understood to be the same patterns as the density correction patterns 50, 51, 52 . . . shown in FIG. 4.

In the related art, one position identification pattern 2, composed of a plurality of ruled lines, is recorded as a common position identification pattern for a plurality of density correction patterns 4, 5, and 6, which have mutually different densities. In such a related art example, in the read image data, the density at the positions where the ruled lines of the position identification pattern 2 and positions in the Y-axis direction coincide with each other are associated with the nozzle positions of the nozzles 21 that recorded the ruled lines. Therefore, when the skew as shown in FIG. 5B occurs, for example, the density of the pixel region 8 in the density correction pattern 6 where the positions of the ruled line 3 and the Y-axis direction coincide with each other is associated with the nozzle position corresponding to the ruled line 3. However, in the example shown in FIG. 5B, considering the skew angle, the density in the density correction pattern 6 that should be actually associated with the nozzle position corresponding to the ruled line 3 is not the density of pixel region 8, but the density of pixel region 7.

As described above, in such related art, since there is only one position identification pattern for a plurality of density correction patterns, if the medium is skewed when the medium is read, it is difficult to accurately identify a read value corresponding to each nozzle position due to an influence of the skew. In particular, as in the density correction pattern 6 shown in FIG. 5B, a density correction pattern that is farther from the position identification pattern 2 is more affected by the skew and, as a result, the density at a position different from the position that should actually correspond to the nozzle position is associated with the nozzle position.

In order to solve such a problem, in the present embodiment, as described above, a plurality of position identification patterns 60 are printed so that position identification patterns 60 are adjacent to all of the plurality of density correction patterns 50, 51, 52 . . . . That is, all of the plurality of density correction patterns 50, 51, 52 . . . are close to a position identification pattern 60. Therefore, with respect to each of the density correction patterns, by using an adjacent position identification pattern 60 as a reference, the read value corresponding to each nozzle position can be identified with high accuracy regardless of the presence or absence of skew at the time of reading the medium.

In step S130, the correction value acquisition section 12b calculates the density correction value for each nozzle position based on the read value of the density correction patterns 50, 51, 52, 53, 54, 55 for each nozzle position identified in step S120. Step S130 will be briefly described. Generally, with a certain single nozzle position as the target, the correction value acquisition section 12b compares the density as the read value of a certain single density correction pattern, for example, the density correction pattern 50, which corresponds to 5% of K, with a predetermined reference value (brightness) expected to be obtained as the read value of the density correction pattern 50, and calculates the density correction values according to the comparison result. In other words, if the density of the density correction pattern 50 is a higher density than the reference value, then a density correction value for reducing (brightening) the density is calculated. On the contrary, if the density of the density correction pattern 50 is a lower density than the reference value, a density correction value for increasing (darkening) the density is calculated. The correction value for decreasing the density is a correction value that acts to decrease the amount of ink, and the correction value for increasing the density is a correction value that acts to increase the amount of ink.

The density correction value calculated in this manner is a correction value for correcting the density (5% of K) in the recording source image data corresponding to the single nozzle position in the density correction pattern 50. The calculation of the density correction value by such a procedure is performed for each nozzle position and for each density (5%, 20%, 40%, 60%, 80%, and 100% of K) in the recording source for each of the density correction patterns 50 to 55. Further, the correction value acquisition section 12b executes interpolation calculation of the density correction values as necessary, and as a result, obtains density correction values for all the nozzle positions and for all the densities (0 to 100% of K). In step S140, the correction value acquisition section 12b stores the density correction values calculated in this manner in the storage section 18 or the like in association with nozzle positions, and ends the flowchart of FIG. 3.

Thereafter, when the control section 11 executes the recording of an image based on image data optionally selected by the user, the data correction section 12c corrects the density of K for each pixel of the image data using the density correction value corresponding to the nozzle position of the nozzle 21 used for recording the pixel and to the density. Based on the corrected image data, the recording control section 12a controls the transport section 16 and the recording section 17 to record the image on the medium 40. As a result, it is possible to obtain a recording result of good image quality in which variations in density for each raster line are corrected.

Note that it is necessary to calculate, using the data correction section 12c, and store density correction values for correction of image data for all ink colors ejected by the recording head 20. Therefore, if the recording head 20 has, for example, nozzle arrays for each of the CMYK inks, then in the present embodiment, a plurality of density correction patterns having different densities are recorded on the medium 40 together with a plurality of position identification patterns 60 for each of the C, M, and Y inks in the same manner as the density correction patterns 50 to 55 and the plurality of position identification patterns 60 for the K ink shown in FIG. 4. The method of identifying the read values corresponding to nozzle positions based on the read image data of a pattern and the method of calculating the density correction values are the same for any of the ink colors.

4. Modifications of Position Identification Pattern

Several modifications of the position identification pattern 60 according to the present embodiment will be described. Combinations of the modifications are also included in the scope of the present embodiment.

First Modification

Figure 6:
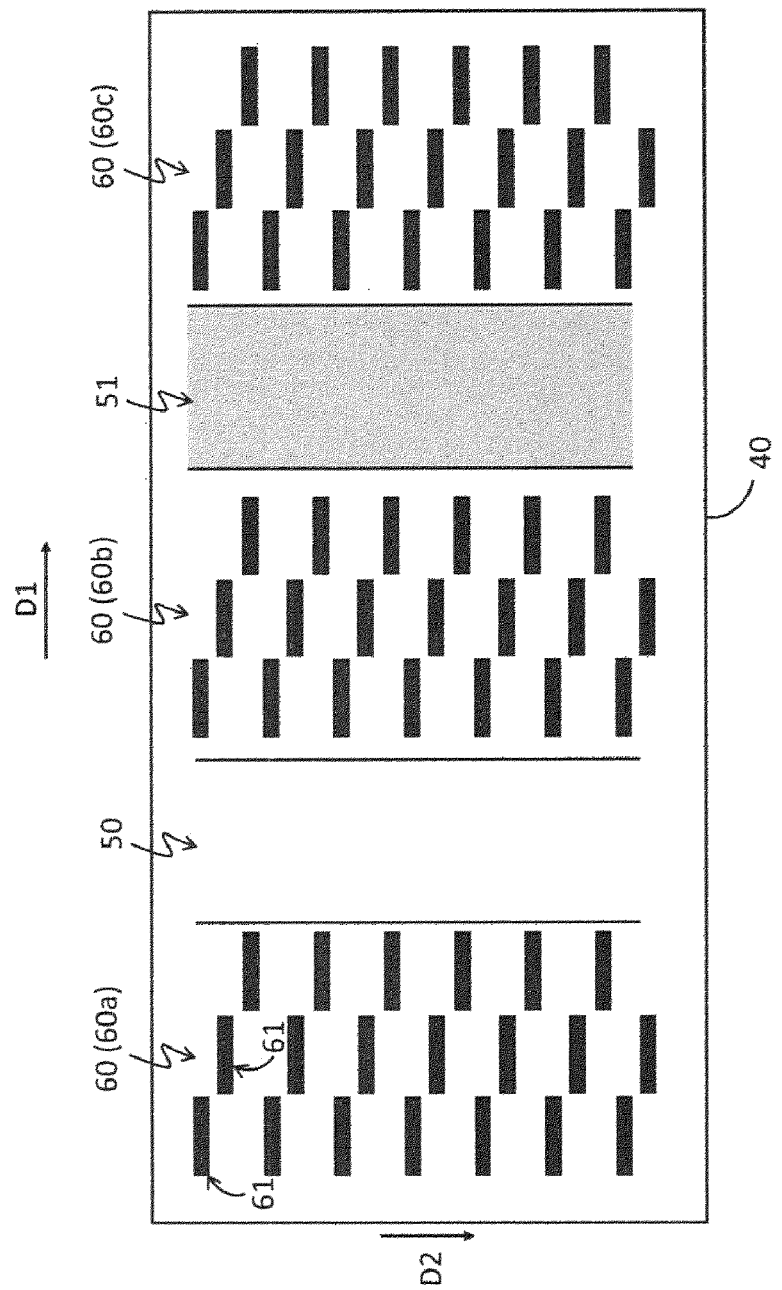
FIG. 6 is a diagram showing a portion of a medium on which a position identification pattern according to a first modification is recorded.
Figure 7A:
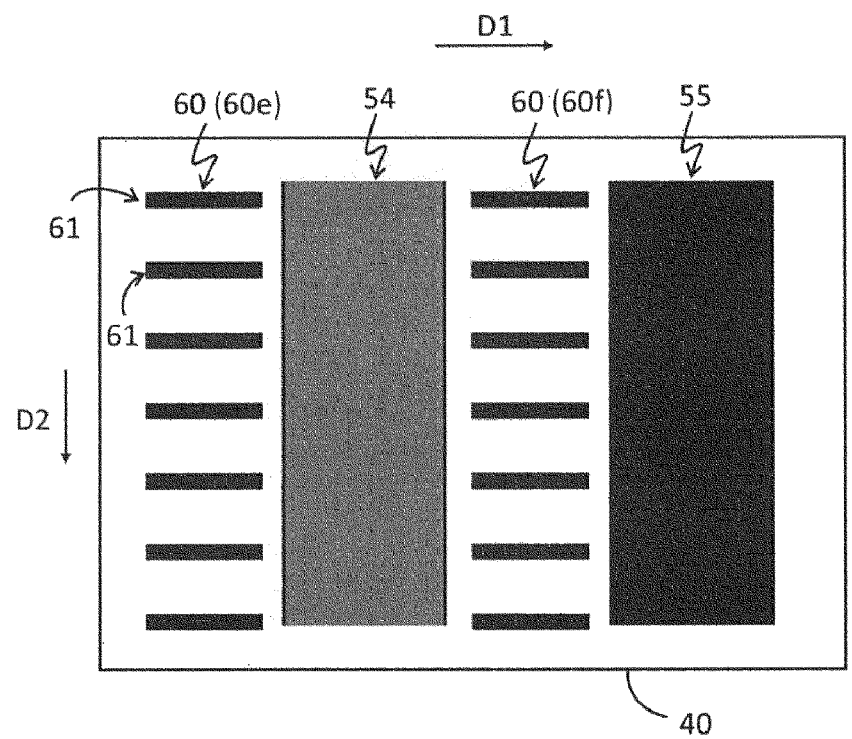
FIG. 7A is a diagram showing a portion of a medium on which a position identification pattern according to a second modification is recorded.
Figure 7B:
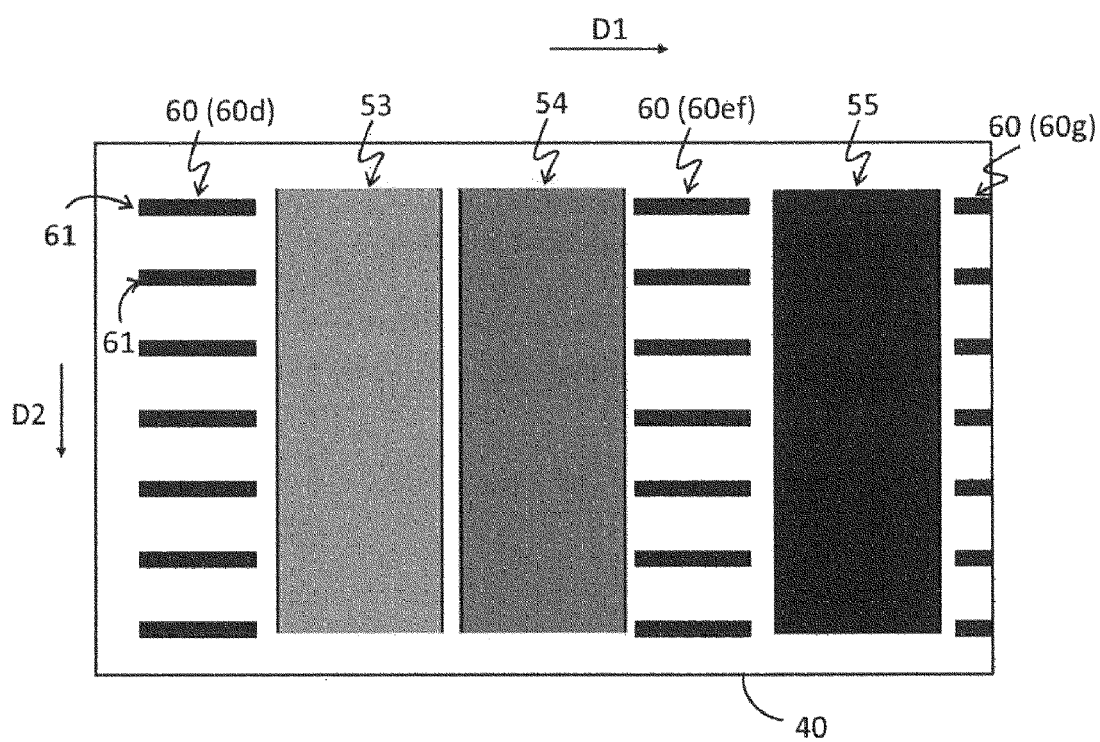
FIG. 7B is a diagram showing a portion of a medium on which a position identification pattern according to a third modification is recorded.

FIG. 6 is an enlarged view of a portion of the medium 40 on which the position identification pattern 60 according to the first modification was recorded in step S100. FIG. 6 and FIGS. 7A and 7B (to be described later) also show the relationship between the medium 40 and the transport direction D1 and the nozzle alignment direction D2 at the time of pattern recording. FIG. 6 shows a portion of the density correction patterns 50 and 51 and position identification patterns 60a, 60b, 60c as a plurality of position identification patterns 60 recorded at positions sandwiching each of the density correction patterns 50 and 51 in the transport direction D1.

As shown in FIG. 6, when recording the position identification patterns 60, the recording control section 12a may perform the recording by shifting the plurality of ruled lines 61 in a direction intersecting the nozzle alignment direction D2, that is, in the transport direction D1. In the example of FIG. 6, in each ruled line 61 that constitutes one position identification pattern 60, three ruled lines 61 continuously arranged in the nozzle alignment direction D2 are shifted from each other in the transport direction D1, and the position in the transport direction D1 becomes the same in a cycle of three. In this way, by recording the respective ruled lines 61 that constitute the position identification pattern 60, by shifting the ruled lines 61 in the intersecting direction of the nozzle alignment direction D2, it is easy to detect and visually recognize the individual ruled lines 61.

In addition, it is possible to increase the recording frequency of the ruled lines 61 in the nozzle alignment direction D2, which leads to an improvement in the accuracy of identifying the read value corresponding to each nozzle position.

Second Modification Example

FIG. 7A shows a portion of the medium 40 on which position identification patterns 60 according to a second modification are recorded in step S100 in an enlarged manner similar to FIG. 6. FIG. 7A shows a portion of the density correction patterns 54 and 55, and position identification patterns 60*e* and 60*f* as a plurality of position identification patterns 60. According to FIG. 7A, the density correction pattern 54 is sandwiched between the position identification pattern 60*e* and the position identification pattern 60*f* in the transport direction D1, but with respect to the density correction pattern 55, the adjacent position identification pattern 60 is only the position identification pattern 60*f*. That is, the density correction pattern may be recorded so as to be adjacent to the position identification pattern 60 only on one of one end side or the other end side in the transport direction D1.

In such a second modification, the density correction pattern 55 is not sandwiched between position identification patterns 60 from both sides. Therefore, in step S120, the correction value acquisition section 12*b* cannot identify the read value of the density correction pattern 55 by using the ruled lines 61 on both sides as a reference as described using FIG. 5A. However, with respect to the density correction pattern 55, the correction value acquisition section 12*b* may identify in step S120 the density at a position where a ruled line 61 of the adjacent position identification pattern 60*f* coincides in the Y-axis direction, as the read value corresponding to the nozzle position of the nozzle 21 that recorded the ruled line 61. That is, since the density correction pattern 55 and the position identification pattern 60*f* are adjacent to each other and are positionally close to each other, then even if skew occurs at the time of reading the medium, the influence of the skew can be minimized, and the read value in the read image data that corresponds to each nozzle position can be identified in the density correction pattern 55 with reference to each ruled line 61 of the position identification pattern 60*f*.

Third Modification Example

FIG. 7B shows a portion of a medium 40 on which a position identification pattern 60 according to a third modification is recorded in step S100 in an enlarged manner as shown in FIG. 6 and FIG. 7A. In FIG. 7B shows a portion of density correction patterns 53, 54, 55 and position identification patterns 60*d*, 60*ef*, 60*g* as a plurality of position identification patterns 60. According to FIG. 7B, the density correction pattern 53 is sandwiched between the position identification pattern 60*d* and the density correction pattern 54 in the transport direction D1, and the density correction pattern 54 is sandwiched between the density correction pattern 53 and the position identification pattern 60*ef* in the transport direction D1. That is, the density correction patterns 53 and 54 are adjacent to each other without a position identification pattern 60 therebetween.

This is one example in which the density correction pattern is adjacent to another density correction pattern on one end side in the intersecting direction of the nozzle alignment direction D2, that is, the transport direction D1, and is adjacent to the position identification pattern 60 on the other end side in the transport direction D1. In the example of FIG. 7B, the density correction pattern 55 is sandwiched between the position identification pattern 60*ef* and the position identification pattern 60*g* in the transport direction D1.

In such a third modification example, the density correction pattern 53 and the density correction pattern 54 are not sandwiched between position identification patterns 60 from both sides. Therefore, similarly to the description regarding the density correction pattern 55 of the second modification example, in step S120, the correction value acquisition section 12*b* may identify the density at the position in the density correction pattern 53 where the position in the Y-axis direction coincides with a ruled line 61 of the adjacent position identification pattern 60*d*, as the read value corresponding to the nozzle position of the nozzle 21 that recorded the ruled line 61. In step S120, the correction value acquisition section 12*b* may identify the density at a position in the density correction pattern 54 where the position in the Y-axis direction coincides with a ruled line 61 of the adjacent position identification pattern 60*ef*, as a read value corresponding to the nozzle position of the nozzle 21 that recorded the ruled line 61.

As another example, the plurality of pattern elements forming the position identification pattern 60 is not limited to ruled lines having length components in the intersecting direction of the nozzle alignment direction D2. The pattern element may be a shape that does not correspond to the concept of such a ruled line, or may be some kind of mark.

In addition, the plurality of pattern elements forming the position identification pattern 60 may not only be completely separated from each other in the nozzle alignment direction D2, but also be partially connected to each other by a line or the like.

5. Summary

As described above, according to the present embodiment, the recording apparatus 10 includes the recording head 20 having the plurality of nozzles 21 that eject liquid onto the medium 40, and the control section 11 that controls the ejection of liquid by the recording head 20. The control section 11 controls the recording head 20 to record first patterns having mutually different densities on the medium 40 in an intersecting direction intersecting a nozzle alignment direction D2 in which the nozzles 21 are arranged, and when a plurality of second patterns for identifying the position of nozzles in the nozzle alignment direction D2 are recorded on the medium 40 in the intersecting direction, recording is performed such that each of the first patterns is adjacent to a second pattern on at least one of one end side or the other end side in the intersecting direction.

According to the configuration, each of the plurality of first patterns is recorded on the medium 40 so as to be adjacent to a second pattern on at least one of the one end side or the other end side in the intersecting direction. Therefore, even when a skew occurs in the medium 40 at the time of reading the medium 40 after pattern recording, for any first pattern it is possible to identify the read value corresponding to each nozzle position with the adjacent second patterns as a position reference. In other words, a pattern is recorded that enables information corresponding to nozzle positions to be accurately acquired from the reading result, even if a skew occurs during reading.

Further, according to the present embodiment, the second pattern includes a plurality of pattern elements formed at intervals in the nozzle alignment direction D2.

According to the configuration, each nozzle position can be represented by each pattern element.

According to the present embodiment, the pattern element is a ruled line having a length component in the intersecting direction.

According to this configuration, each nozzle position can be clearly represented by each ruled line.

Further, according to the present embodiment, the second pattern may be recorded by shifting the plurality of pattern elements in the intersecting direction.

According to the configuration, by shifting the plurality of pattern elements constituting the second pattern in the intersecting direction, it becomes easy to accurately detect the individual pattern elements, and it becomes easy to increase the recording frequency of the pattern elements in the nozzle alignment direction D2.

According to the present embodiment, a first pattern may be adjacent to another first pattern on one end side in the intersecting direction and adjacent to a second pattern on the other end side in the intersecting direction.

According to the configuration, it is possible to reduce the number of second patterns and suppress the ink consumption required for pattern recording while maintaining the effect that accurate information can be acquired without being affected by above mentioned skew.

According to the embodiment, the recording and reading system 1 includes the recording apparatus 10, the reading unit 34 that reads the pattern recorded on the medium 40 by the recording apparatus 10, and the identifying section that identifies the read value in the first pattern corresponding to the position of the nozzle 21 in the nozzle alignment direction D2 based on the reading result by the reading section 34 of the adjacent first pattern and second pattern. According to the above configuration, the system 1 including the recording apparatus 10 can accurately identify the read value corresponding to each nozzle position with respect to each first pattern recorded on the medium 40, based on an adjacent second pattern as the position reference.

The present embodiment is no limited to an apparatus and a system, but also discloses various categories such as a method executed by an apparatus or a system and a program 12 that causes a processor to execute a method.

For example, a recording method that performs a recording by controlling the recording head 20 that has the plurality of nozzles 21 that eject liquid to the medium 40 includes the pattern recording step for recording a pattern on the medium 40 by controlling ejection of liquid by the recording head 20. In the pattern recording step, when a plurality of first patterns having mutually different densities are recorded on the medium 40 in an intersecting direction intersecting a nozzle alignment direction D2 in which the nozzles 21 are arranged, and a plurality of second patterns for identifying the positions of the nozzles 21 in the nozzle alignment direction D2 are recorded on the medium 40 in the intersecting direction, each of the first patterns is recorded so as to be adjacent to a second pattern on at least one of one end side or the other end side in the intersecting direction.

In FIG. 2, a plurality of head chips 22a, 22b, 22c constituting the recording head 20 have OL portions 24a and 24b in which portions thereof overlap each other in the nozzle alignment direction D2, but a configuration having such OL portions is not essential. The recording head 20 may be formed with a nozzle array having a length capable of covering the width of the medium 40 in the nozzle alignment direction D2.

FIG. 2 shows an example in which the recording section 17 corresponds to the recording head 20 of a so-called line printer. However, the recording section 17 may be a recording head 20 of a so-called serial printer that is mounted on a carriage and that ejects ink while reciprocating in a predetermined main scanning direction. In this case, the main scanning direction is the longitudinal direction of the raster line, and the direction intersecting the main scanning direction is the transport direction by the transport section 16 or the nozzle alignment direction D2.

In addition, in the present embodiment, it is assumed that the reading apparatus 30 is mainly a sheet-feed type scanner in that there is a high possibility that the medium 40 will be tilted at the time of reading, but the reading apparatus 30 may be a so-called flat bed type scanner.

What is claimed is:

1. A recording and reading system comprising:
a recording head having nozzles that eject liquid onto a medium;
a control section that controls ejection of the liquid from the recording head, the control section, by controlling the recording head,
recording a plurality of first patterns having mutually different densities, on the medium in an intersecting direction intersecting a nozzle alignment direction in which the nozzles are arranged, and
recording a plurality of second patterns for identifying positions of the nozzles in the nozzle alignment direction, on the medium in the intersecting direction, so that each of the first patterns is adjacent to a second pattern on at least one of one end side or the other end side in the intersecting direction;
a reading section that reads the first patterns and the second patterns recorded on the medium, the reading section being a sheet-feed type scanner that reads the medium while feeding the medium in a transport direction, the transport direction of the medium in the reading section matching the intersecting direction; and
an identifying section that, based on a read result by the reading section of the first patterns and the second patterns that are adjacent to each other, identifies read values of the first patterns at the positions of the nozzles in the nozzle alignment direction, respectively,
the control section determining correction values for the nozzles, respectively, for the ejection of the liquid based on the read values of the first patterns at the positions of the nozzles in the nozzle alignment direction.

2. The recording and reading system according to claim 1, wherein:
the second pattern is composed of a plurality of pattern elements formed at intervals in the nozzle alignment direction.

3. The recording and reading system according to claim 2, wherein:
the pattern element is a ruled line having a length component in the intersecting direction.

4. The recording and reading system according to claim 2, wherein:
the second pattern is recorded by shifting the plurality of pattern elements in the intersecting direction.

5. The recording and reading system according to claim 1, wherein:
the first pattern is adjacent to another first pattern on one end side in the intersecting direction and is adjacent to the second pattern on the other end side in the intersecting direction.

6. A recording and reading method comprising:

controlling an ejection of liquid from a recording head having a plurality of nozzles for ejecting the liquid onto a medium
- to record a plurality of first patterns having mutually different densities, on the medium in an intersecting direction intersecting a nozzle alignment direction in which the nozzles are arranged, and
- to record a plurality of second patterns for identifying positions of the nozzles in the nozzle alignment direction, on the medium in the intersecting direction, so that each of the first patterns is adjacent to a second pattern on at least one of one end side or the other end side in the intersecting direction;

reading, by a reading section, the first patterns and the second patterns recorded on the medium, the reading section being a sheet-feed type scanner that reads the medium while feeding the medium in a transport direction, the transport direction of the medium in the reading section matching the intersecting direction;

identifying, based on a read result by the reading section of the first patterns and the second patterns that are adjacent to each other, read values of the first patterns at the positions of the nozzles in the nozzle alignment direction, respectively; and determining correction values for the nozzles, respectively, for the ejection of the liquid based on the read values of the first patterns at the positions of the nozzles in the nozzle alignment direction.

\* \* \* \* \*